No. 869,235. PATENTED OCT. 29, 1907.
C. G. ETTE.
WASHER.
APPLICATION FILED DEC. 10, 1906.

Witnesses
A. J. McCauley.
Geo. R. Ladson.

Inventor
Charles G. Ette
by Bakewell & Cornwall Attys

UNITED STATES PATENT OFFICE.

CHARLES G. ETTE, OF ST. LOUIS, MISSOURI.

WASHER.

No. 869,235.　　　Specification of Letters Patent.　　　Patented Oct. 29, 1907.

Application filed December 10, 1906. Serial No. 347,145.

*To all whom it may concern:*

Figure 1:
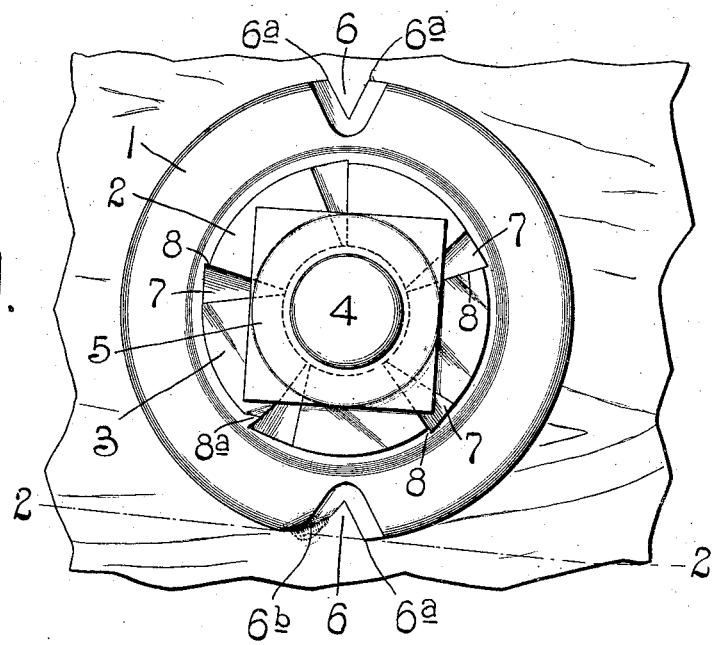
Figure 2:
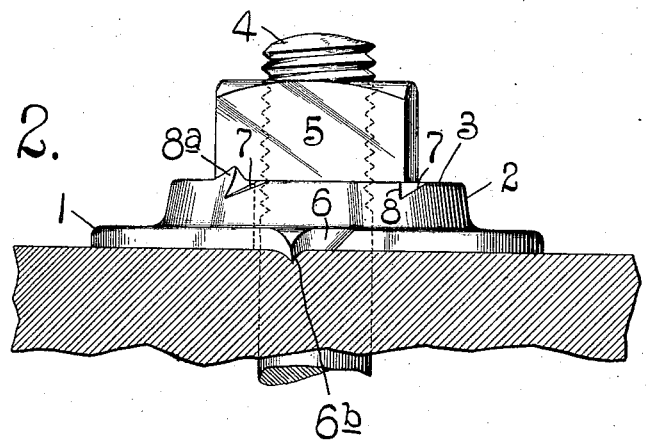
Figure 3:
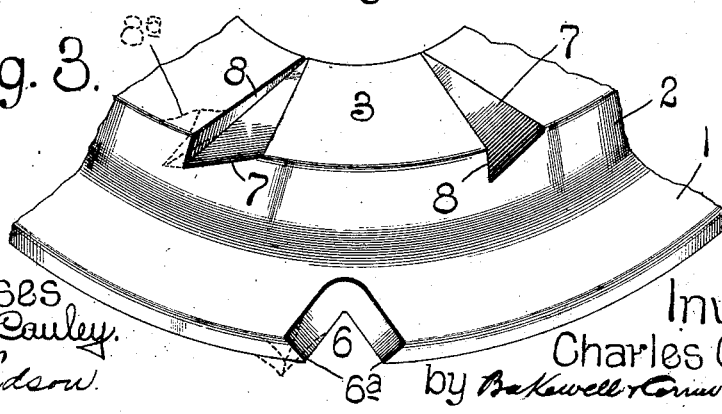

Be it known that I, CHARLES G. ETTE, a citizen of the United States, residing at St. Louis, Missouri, have invented a certain new and useful Improvement in Washers, of which the following is a full, clear, and exact description, such as will enable others skilled in the art to which it appertains to make and use the same, reference being had to the accompanying drawings, forming part of this specification, in which—
Figure 1 is a plan view; Fig. 2 is a sectional view on the line 2—2 of Fig. 1; and Fig. 3 is a detail perspective view of a portion of the washer.

This invention relates to new and useful improvements in washers, and particularly to washers made of malleable iron or other malleable metal.

The object of my invention is to provide this class of washers with efficient locks both for itself and the nut, which locks are simple and add nothing to the weight of the washer.
Referring to the drawings which illustrate the preferred form of my invention, the washer comprises a base flange 1 provided with an integral boss 2, the free end of which constitutes the washer face 3. When the washer is in use a bolt or rod 4 passes through the boss and a nut 5 bears against the washer face.

The base flange 1 is provided with one or more notches 6 which may be of any suitable shape. That part of the base flange in which these notches are formed is preferably beveled to facilitate molding and to present a knife-like edge.

To prevent the nut from turning, the washer must be locked against rotation. When the washer is applied to a timber, the flange 1 is struck a blow adjacent one of the points 6ª, which will cause said point to enter the wood as indicated at 6ᵇ. If the washer is against a metal surface, instead of bending the point 6ª, a lug or bur is struck up by a pointed tool on the metal surface in the space 6.

The face of the washer is provided with recesses or grooves whose edges are adapted to be upset so as to form a lug or projection adjacent the outer edge of the nut to lock said nut against rotation. In the preferred form of my invention, each recess comprises a beveled portion 7, the deepest point of which terminates at a shoulder 8. These recesses are preferably deepest and widest at the outer edge of the face 3 and tapered toward the bolt opening. In this manner the edge of the opening through which the bolt passes is practically continuous so as to offer an uninterrupted bearing for the nut at this point.

To form the nut lock the point of a cold chisel or other suitable tool is placed in the deepest portion of a recess against the shoulder 8, and by striking the opposite end of the tool the metal will be upset at this point, which upset portion 8ª will prevent the nut from turning.

I consider it an advantage to shape the recesses as herein shown because the beveled portion enables the tool to be held at the proper angle in upsetting the metal, and this shape allows the pattern to be drawn freely from the sand during molding. I also consider it an advantage to space the recesses unequal distances apart, or to employ an odd number of recesses spaced equal distances apart as herein shown, as the corners of the nut when screwed home will be located at different distances from their adjacent recesses, and the most desirable point may be selected for the nut lock. It is a further advantage to employ a plurality of recesses because the locking projection is hammered down to unlock the nut, and if it should break or become fractured another recess could be utilized in forming the nut lock when the washer is used again. However, my invention is not limited to a recess of any particular shape or any definite number of recesses.
From the foregoing it will be understood that my invention can be applied to a malleable iron washer of almost any general construction, and if desired may be used as an ordinary washer without using the nut locking features.
Having thus described the invention, what is claimed as new and desired to be secured by Letters Patent is:

1. As a new article of manufacture, a malleable metal washer having a raised portion constituting a nut seat, said seat being provided with a radially disposed groove, said groove having one wall substantially perpendicular, whereby an upsetting tool may be introduced for the purpose of upsetting the wall of said groove, forcing the metal thereof in a vertical direction above the plane of the said nut seat; substantially as described.

2. As a new article of manufacture, a malleable metal washer having a raised portion constituting a nut seat, said seat being provided with an unequal number of radially disposed grooves, each groove having one wall substantially perpendicular, whereby an upsetting tool may be introduced for the purpose of upsetting the wall of said groove, forcing the metal thereof in a vertical direction above the plane of the said nut seat; substantially as described.

3. As a new article of manufacture, a malleable metal washer having a raised portion constituting a nut seat, and a base flange, said raised portion being provided with one or more radially disposed tapered grooves formed with vertical and inclined walls, whereby an up-setting tool may be introduced for the purpose of up-setting the vertical walls of said groove, the up-set metal forming a lock for the nut, the base flange of said washer having a notch forming points, whereby either or both of the points may be bent down into a timber to lock the washer in place; substantially as described.

4. As a new article of manufacture, a malleable metal washer having a raised portion constituting a nut seat, and a base flange, said base flange of said washer having a notch within its marginal line forming points at the marginal line, whereby either or both of the points may be bent down into a timber to lock the washer in place; substantially as described.

In testimony whereof I hereunto affix my signature in the presence of two witnesses, this eighth day of December 1906.

CHARLES G. ETTE.

Witnesses:
   EDW. P. KYLE.
   EDW. SCHMIDDE.